July 17, 1951 C. I. SCHAFER 2,560,600

PULSE SIGNAL DECODER FOR PROPORTIONAL CONTROL

Filed April 30, 1948 3 Sheets-Sheet 1

INVENTOR.
CHESTER I. SCHAFER
BY Wade Koontz
ATTORNEY and
James S. Shannon
AGENT- July 17, 1951 C. I. SCHAFER 2,560,600

PULSE SIGNAL DECODER FOR PROPORTIONAL CONTROL

Filed April 30, 1948 3 Sheets-Sheet 2

INVENTOR.
CHESTER I. SCHAFER
BY Wade Koontz
ATTORNEY
and
James S. Shannon
AGENT

PULSE SIGNAL DECODER FOR PROPORTIONAL CONTROL

Filed April 30, 1948 3 Sheets-Sheet 3

INVENTOR.
CHESTER I. SCHAFER
BY Wade Koontz
ATTORNEY
James S. Shannon
AGENT

Patented July 17, 1951

2,560,600

UNITED STATES PATENT OFFICE 2,560,600

PULSE SIGNAL DECODER FOR PROPORTIONAL CONTROL

Chester I. Schafer, Dayton, Ohio

Application April 30, 1948, Serial No. 24,293

7 Claims. (Cl. 250—27)

(Granted under the act of March 3, 1883, as amended April 30, 1928; 370 O. G. 757)

The invention described herein may be manufactured and used by or for the Government for governmental purposes without payment to me of any royalty thereon.

This invention relates in general to proportional control systems and particularly to a decoding circuit for analyzing a received pulse signal containing proportional control information and producing a control effect in accordance with the information contained in the signal.

The general type of signal with which the circuit is designed to operate consists of a synchronizing pulse followed by a plurality of control pulses. Each control pulse represents a separate control and individual control means are provided at the transmitter for shifting the time position of each of the control pulses away from a neutral or median time position by an amount proportional to the displacement of the control means from its neutral position and in a direction determined by the direction in which the control means is displaced from its neutral position. At the receiving end each of the control pulses is channeled, by means of a suitable pulse selector arrangement, into a decoding circuit of the type to be described which analyzes the time position of the received pulse with respect to its neutral or median time position and causes a mechanical or electrical control effect to follow the received pulse and to assume a position relative to its neutral position which corresponds to the time position of the received control pulse relative to its neutral or median time position. In special cases modified forms of the decoder circuit may be used with signals differing in some respects from the above described type, as will be explained.

It is accordingly the object of the invention to provide a decoding circuit capable of producing a proportional control effect from a received pulse carrying control information in the form of a displacement from a predetermined time position.

It is a further object of the invention to provide a decoding circuit of the above described type that is adaptable to use in a multiple arrangement so that a number of proportional controls may be carried out over a single transmission channel.

Figure 1:
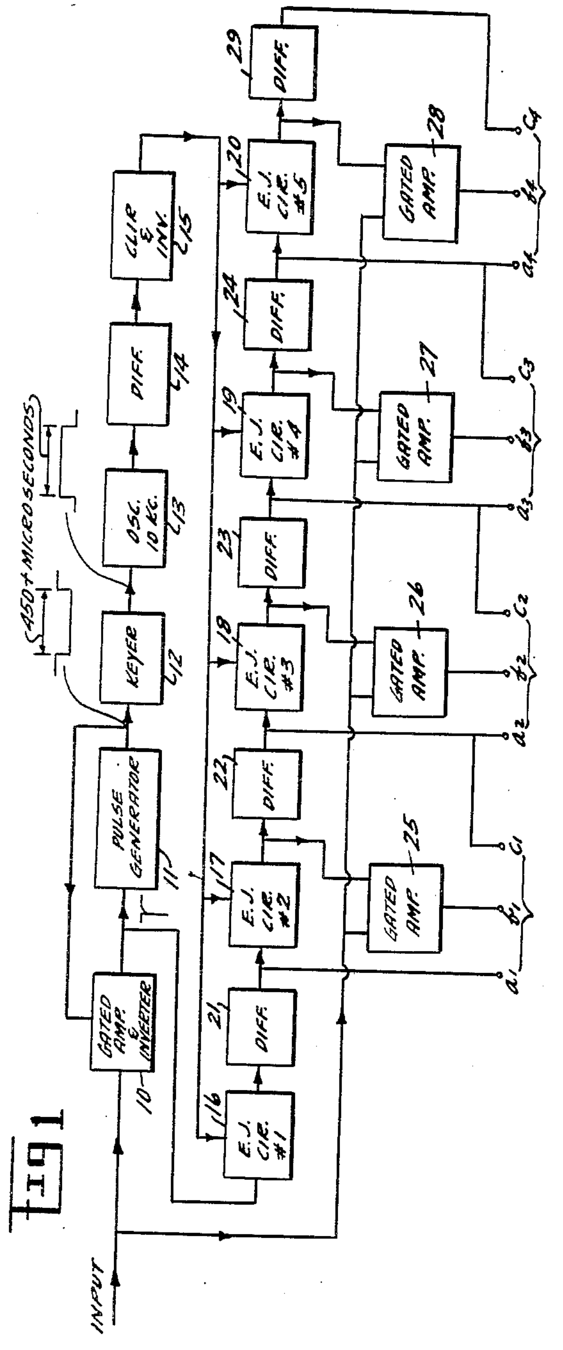
Figure 6:
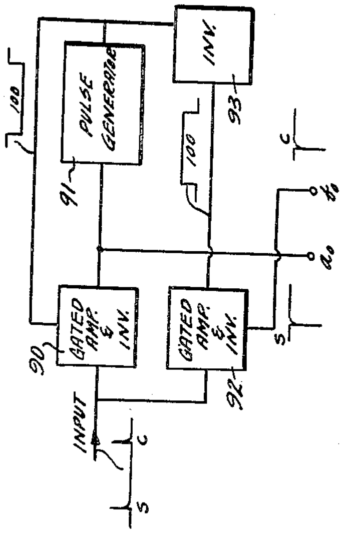
Figure 4:
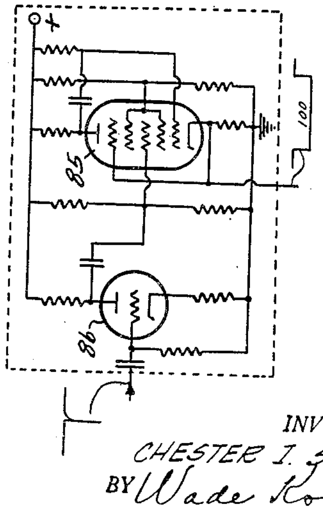
Figure 2:
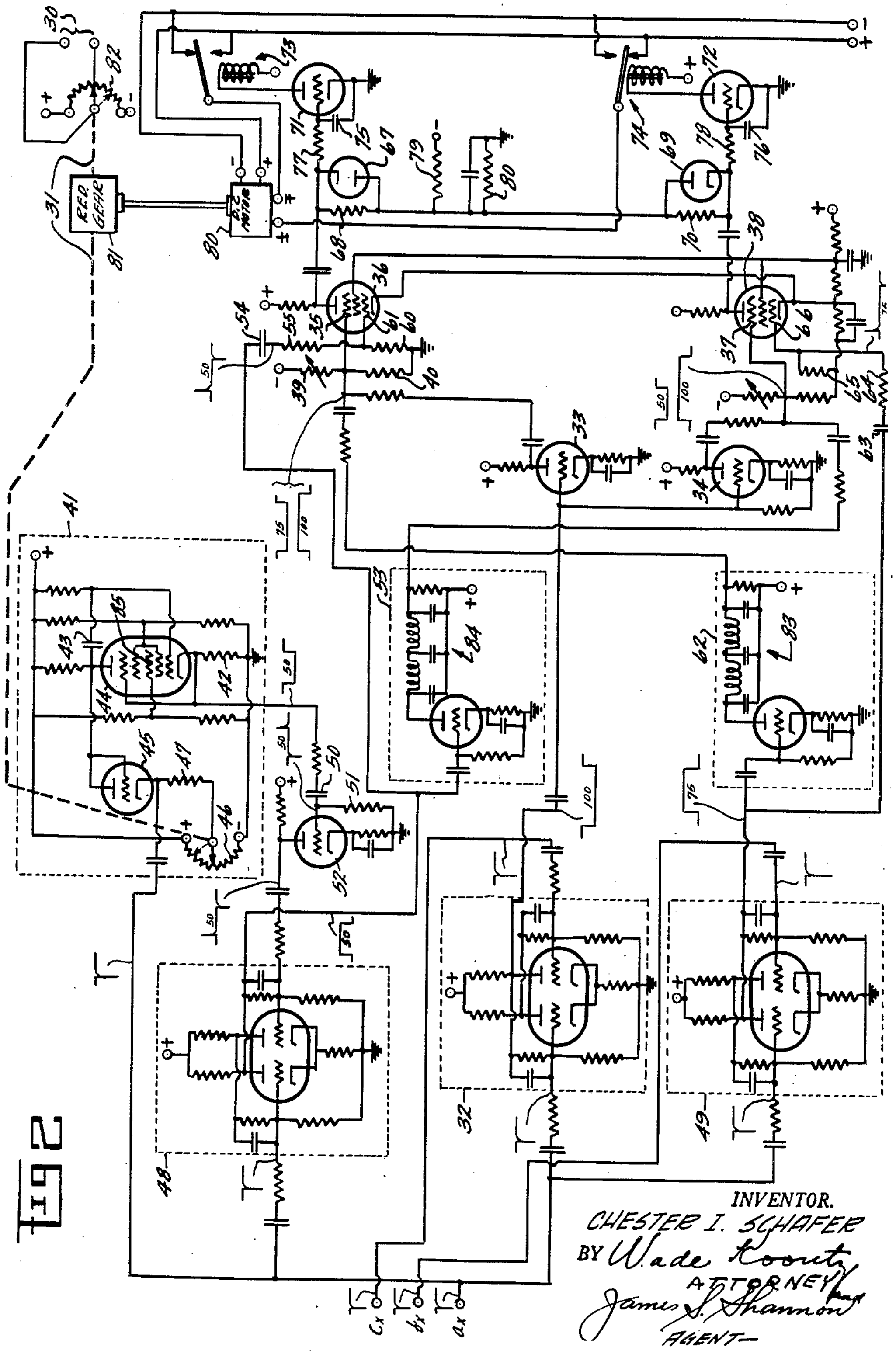
Figure 3:
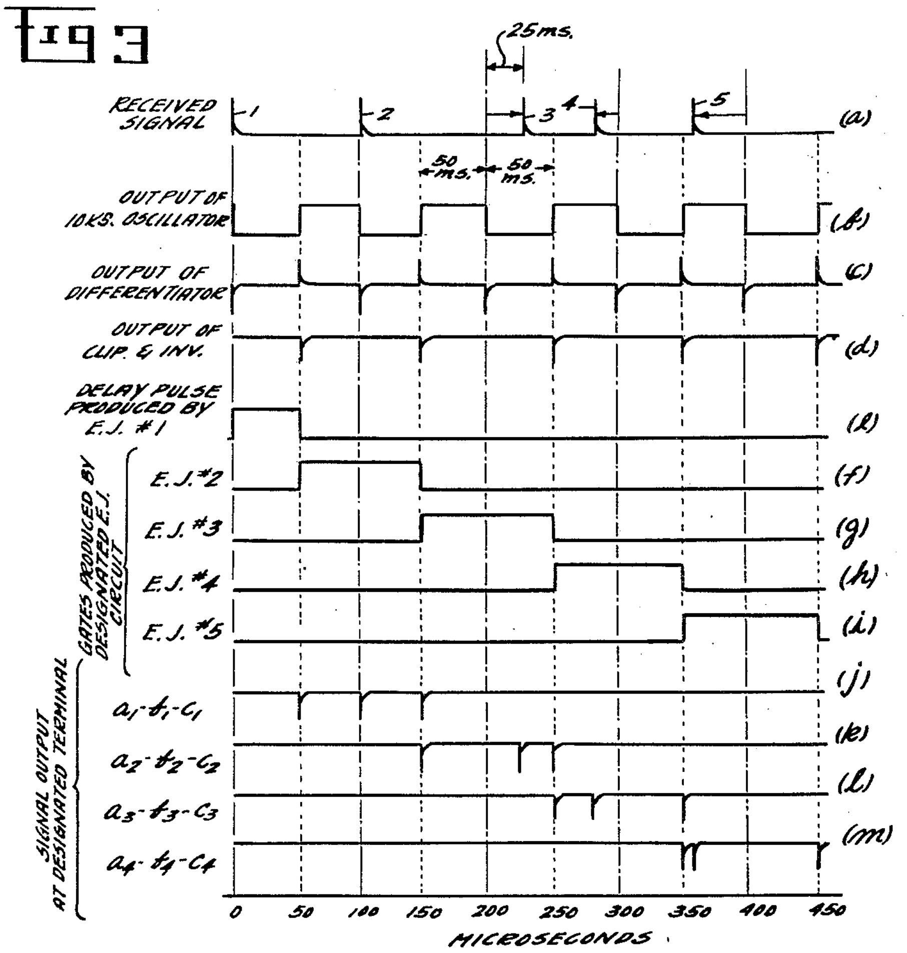
Figure 5:
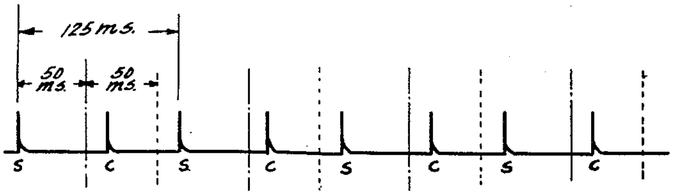

Specific embodiments of the invention will be described in connection with the accompanying drawings in which Fig. 1 shows a suitable pulse selector circuit for use with the decoding circuit, Fig. 2 shows a specific embodiment of a decoding circuit in accordance with the invention, Fig. 3 shows a number of graphs useful in explaining the operation of Figs. 1 and 2, Fig. 4 shows a modification of element 32 of Fig. 2, Fig. 5 shows a simple type of control signal, and Fig. 6 shows a suitable pulse selector circuit for use with a signal of the type shown in Fig. 5.

Referring first to Fig. 3 graph (*a*) shows the general type of signal with which the decoding circuit is designed to operate. In this graph a synchronizing pulse 1 is followed by four control pulses numbered 2, 3, 4 and 5. The median or neutral time positions of the four control pulses are represented by vertical center lines occurring at multiples of a fixed time interval, in this case 100 microseconds, after the synchronizing pulse. Individual control means each displaceable to either side of a neutral or center position are provided in the transmitter for displacing each control pulse to either side of its neutral position. The arrangement is such that when the control means is in its neutral or center position the control pulse is in its neutral position and displacement of the control means from its neutral or center position causes the pulse to be displaced from its neutral position by an amount and in a direction corresponding to the amount and direction of the displacement of the control means. Accordingly pulse 2 is in the neutral position, pulse 3 lags its neutral position by 25 microsecands and pulses 4 and 5 lead their neutral positions, as determined by the positions of the corresponding control means. For example, pulse 3 may be used to transmit right-left control information. In this case the control means may be a control stick movable to the right or left from a neutral position. Displacement of the stick to the right of neutral causes pulse 3 to be displaced to the right of its neutral position by a corresponding amount as shown in Fig. 3 (*a*). As will be seen the maximum permissible displacement of a pulse in this case is 50 microseconds and the limits are defined by vertical dotted lines in Fig. 3.

In order to channel the control pulses 2, 3, 4 and 5 into individual decoding circuits some form of pulse separation circuit is required. A suitable circuit for performing this function is shown in Fig. 1. This circuit is specifically described and claimed in the application of Max E. Sallack, Serial No. 695,068, filed September 6, 1946, U. S. Patent No. 2,443,198, dated June 22, 1948, under the title Pulse Selector Unit, and only the essential features of the circuit will be given in this disclosure. Referring to Fig. 1 an input signal of the type shown in Fig. 3 (*a*) is applied to gated amplifier and inverter 10 which passes the synchronizing pulse 1 causing a negative pulse to be applied to pulse generator 11. This generator may be a multivibrator of the conventional one-cycle type and when triggered by the negative pulse produces a substantially rectangular negative pulse having a duration, in this case, slightly greater than 450 microseconds. The negative rectangular pulse is applied to gated amplifier 10 and serves to block this amplifier for the duration of the pulse thus preventing control pulses 2, 3, 4 and 5 from getting through. The 450+ microsecond pulse is also applied to keyer 12 which applies a positive keying pulse of the same duration to oscillator 13 which is normally blocked. The period of this oscillator is adjusted to equal 100 microseconds, corresponding to a frequency of 10 kilocycles per second. Application of the keying pulse to the oscillator causes it to be unblocked and to oscillate during the presence of the pulse, or for slightly more than four and one-half complete cycles. The oscillator may be a form of tuned multivibrator having a substantially rectilinear output as shown in Fig. 3 (*b*). The output of the oscillator is applied to differentiating circuit 14 which produces therefrom a series of sharp alternately negative and positive pulses spaced 50 microseconds apart as shown at (*c*). This series of pulses is in turn applied to clipper and inverter 15 which removes the negative pulses and inverts the positive pulses resulting in series of negative pulses spaced 100 microseconds apart with the first pulse in the series occurring 50 microseconds after the synchronizing pulse 1 as shown at (*d*).

Blocks 16 through 20 represent identical trigger circuits of the Eccles-Jordan type the details of which are the same as for circuit 48 in Fig. 2. These circuits consist essentially of two amplifier tubes connected in a regenerative loop so that the circuit has two conditions of stability in each of which one tube is fully conductive and the other cut off. The circuit may be triggered from one condition of stability to the other by the application of a negative pulse to the conductive tube. When such a circuit is triggered from one to the other condition of stability by a first negative trigger pulse and back to the original condition of stability by a second negative trigger pulse there is developed a negative rectangular pulse at the anode of one tube and an equal positive rectangular pulse at the anode of the other tube, the duration of the pulses being equal to the time difference between the trigger pulses.

The inverted synchronizing pulse that is applied to multivibrator 11 is also applied to the trigger circuit 16. Also provision is made for applying the series of pulses shown in Fig. 3 (*d*) and obtained from clipper and inverter 15 to each of the trigger circuits 16 through 20. The output of each of the trigger circuits 16 through 19 is coupled to the succeeding trigger circuit through differentiating circuits 21 through 24. The outputs of trigger circuits 17 through 24 are also applied to gated amplifiers 25 through 28, respectively. The input signal applied to gated amplifier 10 is also applied to each of gated amplifiers 25 through 28. Terminals $a_1$ through $a_4$ are connected to the outputs of differentiating circuits 21 through 24, respectively, terminals $b_1$ through $b_4$ are connected to the outputs of gated amplifiers 25 through 28, respectively, and terminals $c_1$ through $c_4$ are each connected to the outputs of differentiating circuits 22, 23, 24 and 29 respectively.

The operation of the circuit of Fig. 1 is as follows: The negative trigger pulse obtained from the inversion of synchronizing pulse 1 by gated amplifier and inverter 10 and applied to multivibrator 11 is also applied to the conductive tube in trigger circuit 16 and triggers this circuit to its other condition of stability. After 50 microseconds the first pulse in series (*d*) is applied to the other tube of circuit 16 and triggers the circuit back to its original condition of stability. This process causes the circuit 16 to generate a positive 50 microsecond pulse as shown in Fig. 3 (*e*). The 50 microsecond pulse is applied to differentiating circuit 21 which produces a sharp positive pulse from its leading edge and a sharp negative pulse from its trailing edge, which two pulses are applied to the grid of the conductive tube in trigger circuit 17. The positive pulse has no effect on the circuit but the negative pulse triggers the circuit to its other condition of stability where it remains until the second pulse in series (*d*), which is applied to the grid of the other tube in circuit 17, triggers the circuit back to its original condition of stability. The effect of these two trigger pulses, which are 100 microseconds apart, on circuit 17 is to cause that circuit to generate a 100 microsecond positive pulse as shown in Fig. 3 (*f*). In a similar manner remaining trigger circuits 18, 19 and 20 generate successive positive 100 microsecond pulses as shown at (*g*), (*h*), and (*i*), each circuit being triggered through one cycle by a negative pulse obtained from the trailing edge of the 100 microsecond pulse generated by the preceding trigger circuit and by the next occurring pulse in the train (*d*). The pulses generated by circuits 17 through 20, which will be termed gates, are applied to gated amplifiers 25 through 28, respectively, and serve to render the amplifiers operative to pass any signal applied to their input circuits during the presence of the gate applied thereto. Since the entire input signal (*a*) is applied to each of the gated amplifiers it is seen from Fig. 3 that control pulse 2 will be applied during the operative period of gated amplifier 25 and will appear at terminal $b_1$. Similarly control pulses 3, 4 and 5 will appear at terminals $b_2$, $b_3$ and $b_4$, respectively. At each of terminals $a_1$ through $a_4$ will appear the negative trigger pulse from the output of differentiating circuits 21 through 24, respectively. At each of terminals $c_1$ through $c_4$ will appear the negative trigger pulse from the output of differentiating circuits 22, 23, 24 and 29. There will also appear at terminals $a_1$ through $a_4$ and $c_1$ through $c_4$ the positive pulses present in the output of the corresponding trigger circuits; however these pulses have no significance as will be seen later. Accordingly the significant trigger pulses appearing at terminals $a_1$—$b_1$—$c_1$ through $a_4$—$b_4$—$c_4$ are as shown in Fig. 3 at (*j*), (*k*), (*l*) and (*m*) respectively. It will be noted that the first and last pulses in these groups of three pulses are spaced 100 microseconds apart and correspond in time to the beginning and end of the corresponding gate pulse. The control information is contained in the direction and amount of the displacement of the intermediate pulse from the midpoint of the time interval defined by the two outer pulses.

A decoding circuit constructed in accordance with the principles of the invention is shown in Fig. 2. This circuit is capable of analyzing a signal of the above described type and of producing a voltage at terminals 30 having a value proportional to the displacement of the intermediate control pulse from its neutral position and a polarity corresponding to the direction of this displacement. If a mechanical control effect is desired this may be obtained by direct mechanical coupling to shaft 31. In explaining the operation of the circuit it is assumed that terminals $a_x$—$b_x$—$c_x$ are connected to terminals $a_2$—$b_2$—$c_2$ of Fig. 1 so that the signal shown at (*k*) in Fig. 3 is applied to the decoding circuit. This signal is seen to comprise two negative pulses defining an interval of 100 microseconds and an intermediate control pulse, which is pulse 3 of original signal (*a*), displaced 25 microseconds to the right of its neutral position in the center of this interval.

The first negative pulse to occur in the signal (*k*) is applied to the grid of the left hand section of the dual section amplifier tube of trigger circuit 32. This circuit is of the conventional Eccles-Jordan type which comprises two amplifier tubes connected in a regenerative loop so that the circuit has two conditions of stability in each of which one tube is fully conducting and the other cut off. The application of a negative trigger pulse to the conductive tube causes a rapid switch to the other condition of stability in which the tube to which the pulse was applied is cut off and the other tube is fully conductive. The application of a second negative pulse to the second tube, which is now conductive, causes a rapid transition back to the first condition of stability with the first tube again conductive and the second tube cut off. This cycle of operation causes a positive pulse to be produced at the anode of one tube and a negative pulse at the anode of the other tube, both pulses being of the same duration as the time interval between the two trigger pulses. In the operation of circuits of this type the application of a positive pulse to the grid of a conductive tube has no effect on the circuit. Also, due to the high negative bias on the grid of the non-conductive tube due to drop across the common cathode resistor caused by the space current of the conductive tube, the application of a positive pulse to the grid of a non-conductive tube has no effect on the circuit provided the pulse amplitude is maintained below the value required to overcome the above mentioned bias and cause conduction in the tube. Hence the previously mentioned positive pulses that also occur at terminals $a_x$ and $c_x$ may be disregarded.

Therefore, assuming that the left hand amplifier section of circuit 32 is initially conductive the application of the first negative pulse of signal (*k*) to the grid thereof through terminal $a_x$ causes this section to be cut off and the other section to become conductive. This condition exists until the third pulse of signal (*k*), which occurs 100 microseconds after the first pulse, is applied to the grid of the right hand amplifier section through terminals $c_x$ and triggers the circuit back to its initial condition of stability with the left hand section conducting and the right hand section cut off. This process produces a 100 microsecond negative pulse at the anode of the right hand section which is applied to the grids of isolating and inverting tubes 33 and 34. The resulting 100 microsecond positive pulse from the output of tube 33 is applied to grid 35 of gated amplifier 36, and that from the output of tube 34 is similarly applied to grid 37 of gated amplifier 38. Tube 36 is normally biased to an inoperative condition by the negative voltage applied to grid 35 from potentiometer 39—40, and tube 38 is biased to an inoperative condition in a similar manner. The positive 100 microsecond pulses applied to grids 35 and 37 are of sufficient amplitude to overcome this disabling bias and to place the tubes in an operative condition for the duration of the pulse. The function of circuit 32 therefore is to place gated amplifiers 35 and 38 in an operative condition for the duration of the input signal (k) applied to terminals $a_x$—$b_x$—$c_x$.

The circuit defined by block 41 is an adjustable delay circuit, the adjustable feature of which is actuated by shaft 31 so that the circuit generates a pulse the duration of which is determined by the position of this shaft. The circuit must be designed so that in the central or neutral position of the shaft the pulse generated has a duration of 50 microseconds while for maximum clockwise rotation of the shaft the pulse duration is 100 microseconds and for maximum counterclockwise rotation of the shaft the pulse duration is zero. The circuit shown for accomplishing this result is known as the "phantastron" delay circuit and an analysis of its operation may be found on pages 2–58 to 2–63 of the book Principles of Radar, second edition, 1946, by the members of the staff of the Radar School, Massachusetts Institute of Technology, published by the McGraw-Hill Book Company. The essential features of the circuit are that a negative pulse is obtained from across cathode resistor 42 the duration of which is determined by the initial charge of condenser 43 which is in turn determined by the initial anode voltage of tube 44. The initial anode voltage of this tube is controlled by diode 45 and potentiometer 46, the diode having its anode connected to the anode of tube 44 and its cathode through resistor 47 to the adjustable contact of potentiometer 46. The point of conduction of diode 45 determines the potential of the anode of tube 44. Rotation of potentiometer 46 clockwise causes the cathode potential of diode 45 to be raised thus allowing the anode potential of tube 44 to rise until the anode potential of the diode equals that of its cathode. Similarly counterclockwise rotation of potentiometer 46 lowers the diode cathode potential causing the anode potential of the diode and that of tube 44 to follow. The circuit may be triggered by application of a negative pulse to the anode of tube 44 through diode 45. The duration of the resulting pulse developed across resistor 42 is very nearly linearly related to the angular position of potentiometer 46, and it is this feature of the circuit that makes its use desirable in this application. However it is not necessary that a delay circuit of the above type be employed and any other suitable adjustable delay circuit, such as a one-cycle multivibrator, may be used.

The first negative pulse of signal (*k*) appearing at terminal $a_o$, in addition to being applied to trigger circuit 32, is also applied to trigger circuits 48 and 49 which are identical to circuit 32, and to the delay circuit 41. In both circuits 48 and 49 the left hand amplifier sections are initially conductive and the effect of this pulse is to cut these sections off and to render the right hand sections conductive. The pulse also triggers delay circuit 41 causing it to generate a negative pulse having a duration proportional to the setting of shaft 31 and potentiometer 46. Since the shaft is shown in its neutral or center angular position the duration of the pulse generated in this case is 50 microseconds. The delay pulse is applied to a differentiating circuit comprising condenser 50 and resistor 51 which converts the leading and trailing edges into sharp negative and positive pulses respectively. These pulses are inverted by tube 52 and applied to the grid of the right hand tube section of circuit 48, the negative pulse acting to trigger this circuit back to its initial condition of stability with the left hand section conductive and the right hand section cut off. The resulting 50 microsecond positive pulse developed at the anode of the left hand section is inverted and delayed by circuit 53 and applied to the grid 37 of tube 38 along with the 100 microsecond pulse from tube 34. The pulse from circuit 48 is also applied to a differentiating circuit comprising condenser 54 and resistors 55 and 60, the resulting sharp positive and negative pulses produced from the leading and trailing edges being applied to grid 61 of tube 36.

The intermediate control pulse of signal (*k*) is applied to terminal $b_x$ and thence to the grid of the right hand tube section of circuit 49. In the case of signal (*k*) this pulse occurs 75 microseconds after the negative pulse at terminal $a_x$ and acts to trigger circuit 49 back to its initial condition of stability. The resulting 75 microsecond positive pulse generated at the anode of the left hand section is inverted and delayed by circuit 62 and applied to grid 35 of tube 36 along with the 100 microsecond pulse from tube 33. The pulse produced by circuit 49 is also applied to a differentiating circuit comprising condenser 63 and resistors 64 and 65, the resulting sharp positive and negative pulses developed from the leading and trailing edges being applied to grid 66 of tube 38.

A rectifier comprising diode 67 and resistor 68 is connected across the output circuit of gated amplifier 36 and a similar circuit comprising diode 69 and resistor 70 is connected across the output of gated amplifier 38. Tubes 71 and 72 have relays 73 and 74, respectively, connected in their plate circuits. The grids of these tubes are connected to the cathodes of rectifiers 67 and 69, respectively, through low pass filters comprising condensers 75 and 76 and resistors 77 and 78. A negative voltage obtained from a potential divider composed of resistors 79 and 80 acts to charge condensers 75 and 76 and to make the grids of tubes 71 and 72 negative with respect to their cathodes by the amount of the condenser voltage. This biasing voltage is made sufficient to reduce the space current of tubes 71 and 72 below the threshold value for relays 73 and 74. In the presence of an output from gated amplifier 35 and 38 a direct voltage is developed across corresponding resistor 68 or 70 which opposes the voltage across resistor 80 and allows condenser 75 or 76 to discharge thus raising the grid potential and anode current of corresponding tube 71 or 72 and actuating corresponding relay 73 or 74. Disappearance of the output signal from the gated amplifier allows the corresponding condenser to recharge and the associated relay to be de-energized.

With the signal shown in Fig. 3 (*k*) applied to terminals $a_x$—$b_x$—$c_x$ and shaft 31 in its neutral or center position the conditions existing in the decoding circuit are as shown in Fig. 2. For reasons explained in detail in the preceding paragraphs a negative 75 microsecond pulse and a positive 100 microsecond pulse are applied to grid 35 of tube 36. Also sharp positive and negative pulses resulting from differentiation of the 50 microsecond pulse produced by circuit 48 are applied to grid 61 of tube 36. The negative pulse applied to grid 35 cancels the 100 microsecond positive gating pulse for 75 microseconds so that the amplifier 36 is only operative during the last 25 microseconds of the 100 microsecond interval. Therefore, since the negative pulse applied to grid 61 occurs at 50 microseconds, this pulse does not get through and relay 73 is not energized. Considering gated amplifier 38, however, a 50 microsecond negative pulse and a 100 microsecond positive pulse are applied to grid 37 while sharp positive and negative pulses resulting from differentiation of the 75 microsecond pulse produced by circuit 49 are applied to grid 66. Since tube 38 is therefore operative for the last 50 microseconds of the 100 microsecond interval and since the negative pulse on grid 66 occurs at 75 microseconds, this pulse gets through. A negative pulse is applied to grid 66 for each successive signal (*k*) applied to the system and these pulses are rectified by diode 69 and operate to actuate relay 74 in the manner already explained.

Operation of relay 74 applies direct voltage to the armature of direct current motor 80 of proper polarity to cause the motor to operate through reduction gear 81 to rotate shaft 31 in a clockwise direction, resulting in the rotation of potentiometers 46 and 82 in the same direction. Rotation of potentiometer 46 in a clockwise direction causes the duration of the delay pulse produced by circuit 41 to increase resulting in an increase in duration of the negative pulse applied to grid 37 of tube 38. The duration of this pulse continues to increase until at a duration of 75 microseconds the tube 38 is cut off at 75 microseconds and the negative pulse applied to grid 66 at that time is no longer passed by this tube. Relay 74 is de-energized as a result and the rotation of shaft 31 ceases. Since the relationship between delay pulse duration and rotation of potentiometer 46 in circuit 41 is linear, or very nearly so, the shaft will have rotated through one-half its maximum travel in the clockwise direction, corresponding to the displacement of the control pulse to the right of its neutral position by one-half the maximum permissible displacement. The new positions of potentiometers 46 and 82 are shown in dotted lines. The shaft 31 will remain in this position so long as the position of the control pulse in signal (*k*) is not changed; it will also remain in this position in the absence of a signal at terminals $a_x$—$b_x$—$c_x$.

It will be noted that another result of a progressive increase in the duration of the delay pulse from circuit 41 by rotation of shaft 31 is to cause the negative pulse applied to the grid 61 of tube 36 to occur progressively later so that the time at which this pulse occurs at 75 microseconds and would therefore be passed by tube 36 coincides theoretically with the time at which the negative pulse applied to grid 37 of tube 38 reaches a length of 75 microseconds causing this tube to block passage of the negative pulse applied to its grid 66. In order to avoid hunting of the system due to this condition the negative pulse on grid 35 of tube 36 and the negative pulse on grid 37 of tube 38 are each slightly delayed by delay networks 83 and 84 respectively so that tube 36 is rendered operative slightly after the 75 microsecond point and tube 38 is rendered inoperative slightly before the 75 microsecond point. The resulting small interval of time during which both tubes are inoperative is sufficient to prevent hunting.

For operation of shaft 31 in a counterclockwise direction assume that the intermediate control pulse of signal (*k*) is shifted back to its neutral position so that the signal becomes the same as that shown at (*j*). With this signal the negative pulse applied to grid 66 of tube 38 occurs at 50 microseconds whereas the negative pulse applied to grid 37 has an initial length of 75 microseconds. The tube 38 consequently does not pass the pulse on grid 66 and relay 74 is not energized. However, the negative pulse applied to grid 61 of tube 36 now occurs initially at 75 microseconds whereas the negative pulse applied to grid 35 has a length of only 50 microseconds. Since this permits operation of tube 36 during the last 50 microseconds of the 100 microsecond interval the negative pulses on grid 61 are passed and act to operate relay 73 thus causing rotation of shaft 31 in a counterclockwise direction. As the shaft rotates in this direction the duration of the pulse produced by circuit 41 becomes progressively less and the negative pulse on grid 61 occurs progressively earlier until at the 50 microsecond point, which is the limit of operability of tube 36, the pulse on grid 61 is no longer passed and relay 73 is de-energized stopping shaft 31 at its center position corresponding to the neutral position of the control pulse. Here again the slight delays produced by networks 82 and 84 prevent hunting by causing tube 38 to become inoperative slightly sooner than otherwise and by causing tube 38 to become operative, due to the progressively increasing duration of the negative pulse on grid 37, a little later than otherwise, thus insuring a short interval in which both tubes are inoperative. The action of the circuit in producing further counterclockwise rotation beyond the center position in response to signals of the type shown in Fig. 3 at (*l*) and (*m*) is of the same character as described above.

In the above description the neutral position of the control pulse was located at the center of the fixed time interval, designated by the first and last pulses of signal. This condition is not necessary, however, and the neutral position of the control pulse may be located at any point within the time interval. The only requirement is that when shaft 31 is in its neutral position the pulse generated by circuit 41 must be equal in duration to the time difference between the beginning of the fixed time interval and the neutral position of the control pulse.

It is not essential that all the control pulses in the signal shown in Fig. 3 (*a*) be used for proportional control. For example, pulses 4 and 5 may be shifted to either side of their neutral position for proportional control while pulses 2 and 3 may be always maintained at their median positions and used for simple on-off control by selectively including or excluding the pulse from the transmitted signal. In this case circuits of the type shown in Fig. 2 would be connected to terminals $a_3$—$b_3$—$c_3$ and $a_4$—$b_4$—$c_4$ in Fig. 1, whereas simple on-off control circuits responsive to the presence of a pulse would be connected to terminals $b_1$ and $b_2$, terminals $a_1$, $c_1$, $a_2$ and $c_2$ not being needed.

The circuit of Fig. 2 may be modified so that in the input signal to the circuit, as in Fig. 3 (*k*) for example, the last pulse, which functions to terminate the 100 microsecond interval, is not required. This modification consists in replacing trigger circuit 32 with any circuit capable of being triggered by the negative pulse from terminal $a_x$, which is the first pulse of signal (*k*), to produce a negative pulse of 100 microseconds duration. A delay circuit of the type shown at 41 is suitable for this purpose. Since it is not necessary that the pulse duration be continuously adjustable in this case, the diode 45 and potentiometer 46 may be dispensed with and an inverter stage 86 provided to apply a positive trigger pulse to grid 85 as shown in Fig. 4. Other suitable circuits are the conventional one-cycle multivibrators such, for example, as those shown on pages 2–50 and 2–53 of the previously mentioned book Principles of Radar. Since the design of such circuits is well known and not a part of the invention no further discussion thereof is necessary in this disclosure. When Fig. 2 is modified as above described there is no need for the *c* terminals of Fig. 1 nor for the $c_x$ terminal of Fig. 2.

In cases where only a single control function is desired the signal may take the form of a series of synchronizing pulses each followed by a control pulse as shown in Fig. 5. The synchronizing pulses in the figure are designated "*s*" and the control pulses "*c*" with the center lines, which are located 50 microseconds from the synchronizing pulses, indicating the neutral positions of the control pulses. The limit of control pulse shift is again 50 microseconds on either side of the neutral position. The separation of synchronizing pulses must be in excess of 100 microseconds and is shown in this case to be 125 microseconds. For a signal of this type a pulse selector circuit having the complexity of that shown in Fig. 1 is not required and a simpler type, such as shown in Fig. 6, may be used. In this circuit the signal shown in Fig. 5 is applied to gated amplifier and inverter 90 which is normally in an operative condition and passes the synchronizing pulse which triggers the pulse generator circuit 91. This circuit generates a 100 microsecond negative pulse which is applied to gated amplifier and inverter 90 rendering it inoperative for the duration of the pulse and thereby preventing passage of the later occurring control pulse. Therefore the only pulses appearing at terminal $a_0$, which is connected to the output of gated amplifier and inverter 90, are the synchronizing pulses *s*. The input signal is also applied to gated amplifier and inverter 92 which is normally biased to an inoperative condition so that the synchronizing pulse is not passed. However the 100 microsecond negative pulse generated by circuit 91 and initiated by the synchronizing pulse is converted to a positive pulse by inverter 93 and applied to gated amplifier and inverter 92 which it renders operative for the duration of the pulse. Control pulses lagging the synchronizing pulses by any amount up to 100 microseconds are therefore passed by element 92 applied to terminal $b_0$. The pulse generator may be of any suitable type such as a one-cycle multivibrator or the type shown in Fig. 4. Some pulse generating circuits supply both positive and negative pulses at different points in the circuit and in such cases the inverter 93 may not be required. The terminals $a_0$ and $b_0$ of Fig. 6 are connected to terminals $a_x$ and $b_x$, respectively, of Fig. 2. Fig. 2 is of course modified in this application by substituting the circuit of Fig. 4, or other suitable pulse generator, for circuit 32, as already explained.

I claim as my invention:

1. A decoding circuit for analyzing a signal of the type having a synchronizing pulse followed by a control pulse adjustable in time over a fixed interval and about a neutral position within said fixed interval, said fixed interval being wholly subsequent to said synchronizing pulse, and for causing a control mechanism having a neutral position to assume a position relative to its neutral position corresponding to the position of said control pulse relative to its neutral position, said circuit comprising first and second gated amplifiers, means for normally biasing said amplifiers to an inoperative condition, means for removing said bias for the duration of said fixed interval, a delay pulse generating means containing a pulse duration adjusting means, said pulse duration adjusting means being actuated by said control mechanism so that in the neutral position of said mechanism the duration of the delay pulse produced by said delay pulse generating means is equal to the time difference between the start of said fixed interval and the neutral position of said control pulse and so that movement of said control mechanism to either side of its neutral position causes a linearly related increase or decrease in the duration of said delay pulse from its duration at the neutral position of the mechanism, means for initiating the pulse generating action of said delay pulse generating means at the beginning of said fixed time interval, means rendering said second gated amplifier inoperative for a period equal to the duration of said delay pulse, means for rendering said first gated amplifier inoperative for a period equal to the period between the beginning of said fixed interval and the occurrence of said control pulse, means for generating a sharp pulse coincident with the trailing edge of said delay pulse and applying same to the input of said first gated amplifier, means for generating a sharp pulse coincident with said control pulse and applying same to the input of said second gated amplifier, means responsive to the presence of an output signal from the first gated amplifier and the absence thereof from the second gated amplifier to move said control mechanism in a delay pulse duration reducing direction, and responsive to the presence of output signal from said second gated amplifier and the absence thereof from said first gated amplifier to move said mechanism in a delay pulse duration increasing direction.

2. Apparatus as claimed in claim 1 in which delay means are provided for slightly delaying the initiation of the periods during which the two gated amplifiers are rendered inoperative with respect to the start of said fixed time interval, for the purpose of preventing hunting in the system.

3. Apparatus as claimed in claim 2 in which means are provided for converting the movement of said control mechanism into a voltage the amplitude of which is proportional to the displacement of the mechanism from its neutral position and the polarity of which is determined by the direction of the displacement with respect to the neutral position.

4. A decoding circuit for analyzing a signal of the type having a synchronizing pulse followed by a control pulse adjustable in time over a fixed interval and about a neutral position within said fixed interval, said fixed interval being wholly subsequent to said synchronizing pulse, and for producing a direct voltage the amplitude of which is proportional to the displacement of the control pulse from its neutral position and the polarity of which is determined by the direction of the displacement with respect to said neutral position, said circuit comprising a potentiometer having a movable contact, means for maintaining a fixed direct voltage across said potentiometer, a tap intermediate the ends of said potentiometer, an output circuit connected between said movable contact and said tap, first and second gated amplifiers, means for normally applying a disabling influence to said amplifiers, means for removing said disabling influence for the duration of said fixed interval, delay pulse generating means containing delay pulse duration adjusting means, a fixed coupling between said movable contact and said delay pulse duration adjusting means, said delay pulse duration adjusting means and said potentiometer being designed so that for zero output voltage the delay pulse duration is equal to the time difference between the start of said interval and the occurrence of said control pulse and for other values of output voltage the delay pulse duration is greater or less than the aforementioned duration, depending upon the polarity of the output voltage, by an amount proportional to the amplitude of the output voltage, means for initiating the pulse generating action of said delay pulse generating means at the beginning of said fixed time interval, means associated with said delay pulse generating means for rendering said second gated amplifier inoperative for a period beginning slightly after the start of said fixed time interval and equal in length to the duration of said delay pulse, means for rendering said first gated amplifier inoperative for a period beginning slightly after the start of said fixed time interval and equal in length to the time between the start of said fixed time interval and the occurrence of said control pulse, means for generating a sharp pulse coincident with the trailing edge of said delay pulse and applying same to the input of said first gated amplifier, means for generating a sharp pulse coincident with said control pulse and applying same to the input of said second gated amplifier, and means associated with said potentiometer and the output circuits of said gated amplifiers and responsive to the presence of output signal from said first amplifier and the absence thereof from said second amplifier to move said movable contact in a delay pulse duration decreasing direction, and responsive to the presence of output signal from said amplifier and the absence thereof from said first amplifier to move said movable contact in a delay pulse duration increasing direction.

5. A decoding circuit for analyzing a signal of a type comprising first and second trigger pulses separated by a fixed time interval and a control pulse having a neutral position intermediate said trigger pulses and adjustable on either side of said neutral position over the fixed time interval defined by said trigger pulses, and for causing a control mechanism having a neutral position to assume a position relative to its neutral position corresponding to the position of said control pulse relative to its neutral position, said circuit comprising first, second and third trigger circuits, said trigger circuits being of the type having two amplifier tubes connected in a regenerative loop whereby the circuit has two conditions of stability in each of which one of the tubes is fully conductive and the other cut off and in which triggering of the circuit from one condition of stability to the other and then back to the first by two time separated trigger pulses results in the production of a rectangular pulse of duration equal to the time difference between the trigger pulses, a delay pulse generating circuit containing delay pulse duration adjusting means, means for applying said first trigger pulse to said first trigger circuit for triggering said circuit from its first to its second condition of stability, means for also applying said first trigger pulse to said delay pulse generating circuit for initiating the generation of a delay pulse, means for producing a trigger pulse from the trailing edge of said delay pulse and for applying same to said first trigger circuit for triggering said circuit back to its first condition of stability, means for applying said first trigger pulse to said second trigger circuit for triggering said circuit from its first to its second condition of stability, means for applying said second trigger pulse to said second trigger circuit for triggering said circuit from its second back to its first condition of stability, means for applying said first trigger pulse to said third trigger circuit for triggering said circuit from its first to the second condition of stability, means for applying said control pulse to said third trigger circuit to trigger said circuit from its second back to its first condition of stability, a first and a second gated amplifier, means for normally biasing said amplifiers to an inoperative condition, means for applying the rectangular pulse generated by said second trigger circuit to said amplifiers to overcome said bias for the duration of said fixed interval, means for slightly delaying the rectangular pulse produced by said first trigger circuit and applying same to said second gated amplifier to render it inoperative for the duration of said pulse, means for slightly delaying the rectangular pulse produced by said third trigger circuit and applying same to said first gated amplifier to render it inoperative for the duration of said pulse, means for generating a sharp pulse from the trailing edge of said delay pulse and applying same to the input of said first gated amplifier, means for generating a sharp pulse from the trailing edge of the pulse produced by said third trigger circuit and applying same to the input of said second gated amplifier, means providing a positive coupling between said control mechanism and the pulse duration adjusting means of said delay pulse generating means, said pulse duration adjusting means being designed and set relative to said control mechanism so that in the neutral position of said control mechanism the delay pulse duration is equal to the time interval between said first trigger pulse and said neutral position of the control pulse and so that movement of said control mechanism to either side of its neutral position causes a linearly related increase or decrease in the duration of said delay pulse from its duration at the neutral position of the mechanism, and means connected between the output circuits of said gated amplifiers and responsive to the presence of an output signal from said first gated amplifier and the absence thereof from said second gated amplifier for causing said control mechanism to move in a delay pulse duration reducing direction and responsive to the presence of output signal from said second gated amplifier and the absence thereof from said first gated amplifier for causing said control mechanism to move in a delay pulse duration increasing direction.

6. A decoding circuit for analyzing a signal of the type comprising a trigger pulse and a subsequently occurring control pulse having a neutral time position occurring within a fixed time interval measured from said trigger pulse, and for causing a control mechanism having a neutral position to assume a position relative to its neutral position corresponding to the position of said control pulse relative to its neutral position, said circuit comprising first, second and third trigger circuits, said first and third trigger circuits being of the type having two amplifier tubes connected in a regenerative loop whereby the circuit has two conditions of stability in each of which one of the tubes is fully conductive and the other cut off and in which triggering of the circuit from one condition of stability to the other and then back to the first by two time separated trigger pulses results in the production of a rectangular pulse of duration equal to the time difference between the trigger pulses, said second trigger circuit being a circuit capable upon being triggered of generating a rectangular pulse of duration equal to said fixed time interval, a delay pulse generating circuit containing delay pulse duration adjusting means, means for applying said first trigger pulse to said first trigger circuit for triggering said circuit from its first to its second condition of stability, means for also applying said first trigger pulse to said delay pulse generating circuit for initiating the generation of a delay pulse, means for producing a trigger pulse from the trailing edge of said delay pulse and for applying same to said first trigger circuit for triggering said circuit back to its first condition of stability, means for applying said first trigger pulse to said second trigger circuit for triggering said circuit to produce a rectangular pulse of duration equal to said fixed time interval, means for applying said first trigger pulse to said third trigger circuit for triggering said circuit from its first to the second condition of stability, means for applying said control pulse to said third trigger circuit to trigger said circuit from its second back to its first condition of stability, a first and a second gated amplifier, means for normally biasing said amplifiers to an inoperative condition, means for applying the rectanguler pulse generated by said second trigger circuit to said amplifiers to overcome said bias for the duration of said fixed interval, means for slightly delaying the rectangular pulse produced by said first trigger circuit and applying same to said second gated amplifier to render it inoperative for the duration of said pulse, means for slightly delaying the rectangular pulse produced by said third trigger circuit and applying same to said first gated amplifier to render it inoperative for the duration of said pulse, means for generating a sharp pulse from the trailing edge of said delay pulse and applying same to the input of said first gated amplifier, means for generating a sharp pulse from the trailing edge of the pulse produced by said third trigger circuit and applying same to the input of said second gated amplifier, means providing a positive coupling between said control mechanism and the pulse duration adjusting means of said delay pulse generating means, said pulse duration adjusting means being designed and set relative to said control mechanism so that in the neutral position of said control mechanism the delay pulse duration is equal to the time interval between said first trigger pulse and said neutral position of the control pulse and so that movement of said control mechanism to either side of its neutral position causes a linearly related increase or decrease in the duration of said delay pulse from its duration at the neutral position of the mechanism, and means connected between the output circuits of said gated amplifiers and responsive to the presence of an output signal from said first gated amplifier and the absence thereof from said second gated amplifier for causing said control mechanism to move in a delay pulse duration reducing direction and responsive to the presence of output signal from said second gated amplifier and the absence thereof from said first gated amplifier for causing said control mechanism to move in a delay pulse duration increasing direction.

7. A decoding circuit for analyzing a signal of the type having first and second trigger pulses separated by a fixed time interval and a control pulse having a neutral position intermediate said trigger pulses and adjustable on either side of said neutral position over the fixed time interval defined by said trigger pulses, and for causing a control mechanism having a neutral position to assume a position relative to its neutral position corresponding to the position of said control pulse relative to its neutral position, said circuit comprising first and second gated amplifiers, means for normally applying a disabling bias to said amplifiers, means for removing said disabling bias for the time interval between said first and second trigger pulses, means including an adjustable delay means for producing a sharp pulse occurring later than said first trigger pulse by the amount of delay produced by said delay means and applying said pulse to the input of said first gated amplifier, means including said adjustable delay means for rendering said second gated amplifier inoperative for a period of time equal to the delay produced by said delay means and starting slightly after said first trigger pulse, means for rendering said first gated amplifier inoperative for a period equal to the time difference between said first trigger pulse and said control pulse and starting slightly later than said first trigger pulse, means for applying a sharp pulse coincident with said control pulse to the input of said second gated amplifier, said adjustable delay means being coupled to said control mechanism and being so designed that said delay varies linearly with respect to movement of said control mechanism and produces a delay at the neutral position of said mechanism equal to the time difference between said first trigger pulse and said neutral position of the control pulse, and means coupling the output circuits of said gated amplifiers to said control mechanism and responsive to the presence of output signal from said first amplifier and the absence thereof from said second amplifier to cause movement of said control mechanism in a delay decreasing direction and responsive to the presence of output signal from said second amplifier and the absence thereof from said first amplifier to cause movement of said mechanism in a delay increasing direction.

CHESTER I. SCHAFER.

REFERENCES CITED

The following references are of record in the file of this patent:

UNITED STATES PATENTS

| Number | Name | Date |
|---|---|---|
| 2,433,667 | Hollingsworth ------ | Dec. 30, 1947 |